July 16, 1940. D. VON GROLMAN 2,208,089
BREAST PUMP
Filed July 26, 1939
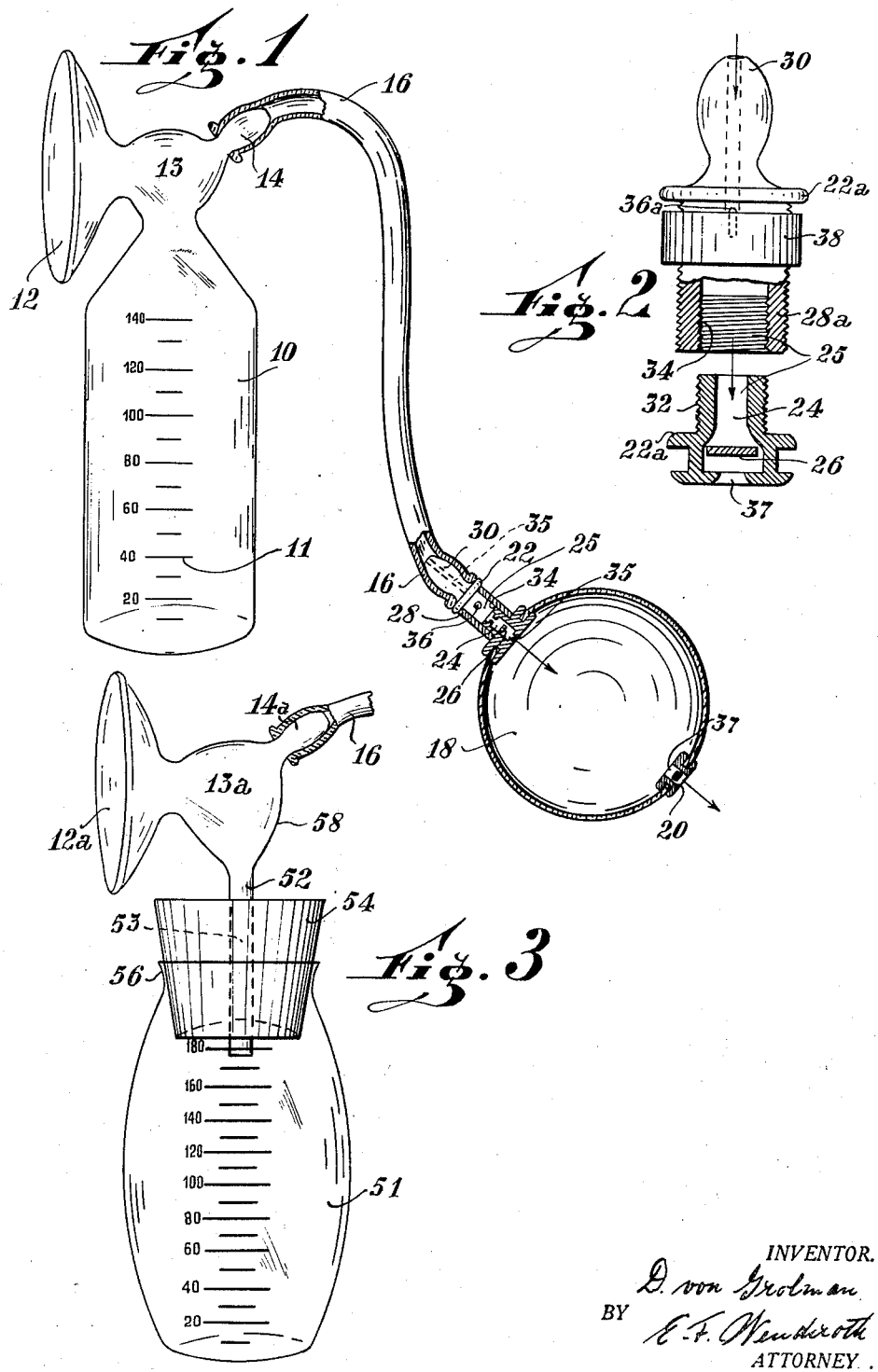

Patented July 16, 1940

2,208,089

UNITED STATES PATENT OFFICE 2,208,089

BREAST PUMP

Dietrich von Grolman, Buenos Aires, Argentina

Application July 26, 1939, Serial No. 286,708

1 Claim. (Cl. 128—281)

The present invention relates to breast pumps or physiological extractors and more particularly to the type intended for the mechanical extraction of milk from the breast in cases in which such a course is advisable for medical reasons.

One of the objects of the present invention is to provide a breast pump for the extraction of milk whereby the process of extraction may readily be adapted to the physiological requirements or peculiarities of each individual.

A further object of the present invention is to provide a pumping device for the extraction of liquid matter or secretions from the human body particularly adapted for use when the extraction must be performed gently and with a rhythmic variation of the suction.

It has not hitherto been possible to extract milk from the human breast by the aid of known apparatus in a manner suited to the particular individual. Rather has it been the practice to extract the milk simply under constant negative pressure. This process, however, often causes considerable pain to the patient. The mechanical extraction of milk in continuous streams frequently gives rise to spasms which stop the secretions and cause other complications. All these undesirable features may henceforward be avoided by use of the novel breast pump in accordance with the present invention.

Said novel breast pump is designed to enable the extraction of the milk to be performed in strict accordance with the sensitivity of the patient and the device may also be used for massage and for stimulation of the glands.

The breast pump according to the present invention consists in the combination with a receptacle or container having an inlet for liquid and an outlet for air, of a bulb of elastic material, preferably rubber, provided with a one-way air expulsion valve and a one-way air suction valve, said suction valve being adapted to be connected by means of a flexible tube to the air outlet of the container, the enclosed space comprised between the inlet for liquid and the valve body of the suction valve constituting a low pressure chamber, there being provided at a point of said low pressure chamber breather, means allowing a predetermined inflow of air whereby the vacuum generated within said low pressure chamber by operation of the bulb is regulated by the entry of air at a predetermined rate. In this manner for every compression of the bulb a cycle of suctional effort is obtained in which the vacuum or negative pressure first rises rapidly to a maximum and then owing to the entry of air through said breather means falls gradually and automatically to a minimum at which equilibrium with the atmosphere is established. On this cyclic operation the physiological value of the apparatus depends, since its effects are thereby caused to approximate closely to those of natural suckling.

In accordance with a further feature of the present invention provision is made for adjusting the effective size of the breather openings as will hereinafter be explained so that the intensity of the suction at its maximum and the rate of reduction thereof can likewise be adjusted to the needs of the individual.

The breather means may consist of one or more simple orifices formed at one or more points of the low pressure chamber, for example, in the wall of the receptacle or in the flexible tube or they may be provided in a convenient part of the suction valve housing. Thus according to one embodiment the suction valve is provided with a hollow annular member interposed between the valve and the coupling member, said annular member having one or more calibrated orifices or slots. According to a modification, the breather openings may be adjusted by means of a screw, a movable ring of rubber or other suitable material or the like.

The inlet end of the suction valve is provided with a smooth or screw-threaded inlet pipe which serves at the same time as coupling means for receiving the flexible tube, the other end of which is adapted to be readily coupled to any known type of breast pump receptacle comprising a container, generally of glass, fitted with a mouthpiece and an attachment pipe.

When the breather means is provided in the flexible tube or in the container itself, a rubber adjustment ring may also be used for varying the effective opening of the breather means.

In the drawing:

Fig. 1 is a side view partly in section of the breast pump according to the present invention.

Fig. 2 is an exploded view partly in section of one type of suction valve suitable for use in the novel breast pump, and Fig. 3 is a perspective view partly in section illustrating the application of the novel pumping device to a detachable receptacle.

With particular reference to Fig. 1, the breast pump according to the present invention consists of the combination with a receptacle 10 which is preferably of glass and is graduated and provided with a mouth or inlet for fluids 12 and a coupling and air outlet pipe 14, of a bulb 18 of flexible material, preferably rubber, which in the embodiment illustrated is provided at diametrically opposed points with a one-way air outlet valve 20 and a one-way air suction valve 22, the latter being connected with the outlet pipe 14 of the receptacle 10 by means of a flexible tube 16 likewise preferably of rubber. The suction valve 22 comprises a lower body member 24 and an upper body member 28 forming together a valve chamber 25 enclosing the valve body 26. Each body member 24, 26 has a passage 35 to allow air to enter and leave the structure by way of the chamber 25. The upper body member carries the coupling member 30.

The lower body member 24 is externally screw-threaded as at 32 to provide for screwed connection thereto of the upper body member 28 which has an internal screwthread 34.

The air expulsion valve 20 has a passage 37 to allow air to escape therethrough into the atmosphere.

A calibrated orifice 36 (Fig. 1) is formed in the upper body member 28 and communicates with the central opening. Said orifice 36 functions to supply a limited amount of air to the low pressure chamber comprised between the mouth 12 of the receptacle 10 and the valve body 26 of the suction valve 22 whereby the vacuum produced by compression of the bulb is gradually diminished and a cyclic operation of the device is obtained.

In Fig. 2 a slightly modified form of suction valve is shown in which one or more slots 36a are formed at convenient points of the upper body member 28a which is externally threaded to receive screwed thereon an adjustable sleeve 38. Rotation of said sleeve causes movement thereof longitudinally of the body member 28a and of said slot or slots 36a whereby the effective opening of said slot or slots may be adjusted in accordance with the requirements in a particular case.

In Fig. 1, the novel breast pump according to the present invention is shown as comprising a receptacle of the standard type used in connection with known breast pumps. If, however, the milk is, after extraction, to be used for feeding an infant the use of such a receptacle would involve transference of the contents thereof to a feeding bottle. Moreover, the receptacle of the type illustrated in Fig. 1 is not very easily cleaned thoroughly enough to allow the milk to be used for feeding.

In Fig. 3, there is illustrated a modification of the combination which is the subject matter of the present invention, according to which a graduated feeding bottle may be used as the effective receptacle of the extracted milk, thus avoiding the dangers and inconveniences attendant on the standard form of receptacle.

In accordance with the embodiment shown in Fig. 3, the valve 22 of the bulb 18 is connected by means of the flexible tube 16 to a receiving member 58 comprising an intermediate chamber 13a having a mouth or inlet for liquids 12a and a coupling and air outlet member 14a as well as a downwardly extending pipe 52 adapted to fit into a longitudinal perforation 53 of a rubber stopper 54 designed to fit tightly into the mouth 56 of a feeding bottle 51. By this modified combination it is possible to collect the extracted milk directly in the feeding bottle and since the latter may be and generally is graduated, the proper quantity of milk may be administered to the infant even if the amount extracted is in excess of the prescribed ration. The receiving member 58 may readily be detached from the rubber tube 16 and the stopper 54 and may be sterilised by boiling.

As hereinbefore stated the novel breast pump according to the present invention operates in a cyclic manner and will now be more fully explained. In practice the mouth 12 of the container 10 is applied to the breast of the patient, a slight pressure being exerted in order to ensure an air-tight fit. Upon compressing the bulb 18, the air therein contained is expelled to the atmosphere through the expulsion valve 20 thereby producing a partial vacuum within the bulb which acts to open the suction valve 22 and withdraw air from the low pressure chamber whereby suction is applied to the breast and the extraction of milk is initiated. The milk passes first into the intermediate chamber 13 and thence flows by gravity into the main portion of the receptacle 10. Immediately upon the establishment of the partial vacuum in the low pressure chamber atmospheric air begins to enter through the breather orifice 36 thereby reducing the vacuum and minimising the suction effect on the breast. This functional cycle is repeated every time the bulb 18 is compressed and it will be noted that the suction applied to the breast is not constant but rhythmic and that the peak suction is effective for a very brief period of time indeed. Moreover, as hereinbefore indicated, the intensity of the maximum suctional effort may be adjusted by adjusting the effective area of the breather orifice so that in the case of very sensitive persons a very low degree of suctional effort may be applied thus avoiding strain and discomfort. Operation of the bulb 18 is continued until a sufficient quantity of milk has been extracted as indicated by the graduations 11 on the receptacle.

I claim:

A breast pump for the extraction of milk by an adjustable cyclic suction comprising the combination with a receptacle having an inlet for liquids and an outlet for air of a bulb of elastic material provided with a one-way air expulsion valve and a one-way air suction valve, said suction valve comprising an upper body portion and a lower body portion secured to said upper body portion and forming therewith a valve chamber, a passage through said upper body portion and a passage through said lower body portion, said passages communicating with each other through said valve chamber, a valve body within said valve chamber normally interrupting the communication between said passages, a coupling member on said upper body portion, a flexible tube connecting said coupling member to said air outlet whereby a low pressure chamber is formed between said inlet for liquids and said valve body, breather means provided in said upper body portion, and consisting of slots located between said coupling member and said valve body, whereby the interior of said low pressure chamber is in communication with the atmosphere and a negative pressure produced within said low pressure chamber by compression of the bulb is gradually and automatically reduced at a predetermined rate, and means comprising an annular member mounted on the outside of said upper body portion and adapted to be moved longitudinally thereof to cover said slots to a greater or lesser extent for adjusting the effective size of said slots and thereby controlling the rate of reduction of said negative pressure.

DIETRICH VON GROLMAN.